Dec. 19, 1933.  V. BUSH  1,939,875
CABLE
Filed Jan. 22, 1925   2 Sheets-Sheet 1

Inventor:
Vannevar Bush
by Roberts, Roberts & Cushman
Att'ys.

Dec. 19, 1933.　　　V. BUSH　　　1,939,875
CABLE
Filed Jan. 22, 1925　　2 Sheets-Sheet 2
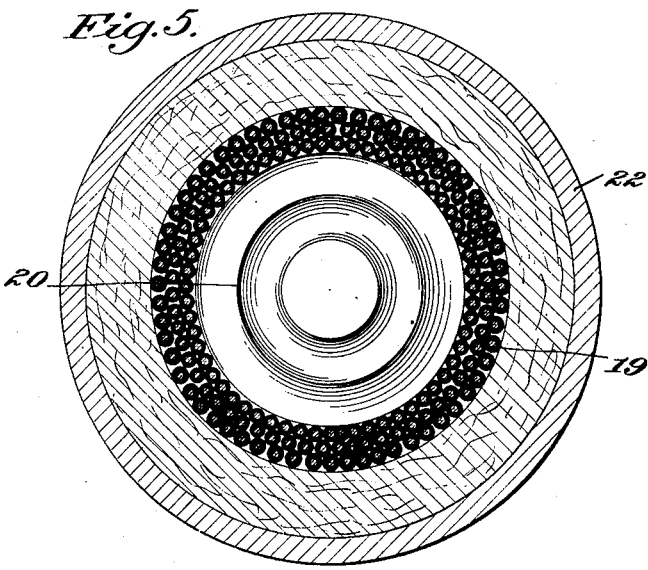
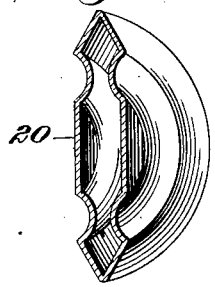
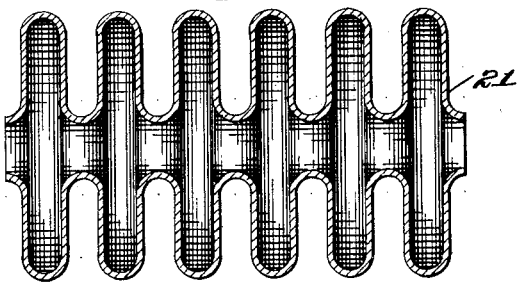
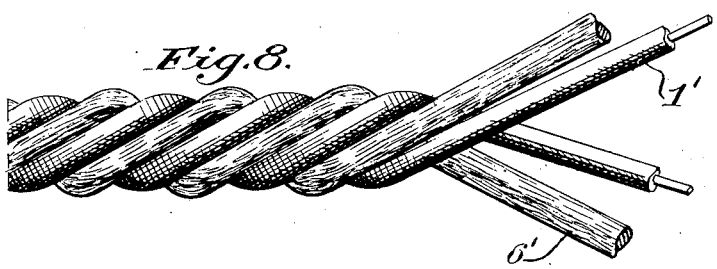
Inventor:
Vannevar Bush,
by Roberts, Roberts & Cushman
Att'ys.

Patented Dec. 19, 1933

1,939,875

UNITED STATES PATENT OFFICE 1,939,875

CABLE

Vannevar Bush, West Medford, Mass.

Application January 22, 1925. Serial No. 4,113

36 Claims. (Cl. 173—266)

This invention relates to cables, and more particularly to a cable suited for high voltage use, and it comprises a cable structure composed of a central conductor, or plurality of conductors, surrounded and protected by a lead sheath, the space between the conductor and sheath being filled with insulating material. In cables made according to present practices the insulation material between the conductor and sheath is usually impregnated with suitable compound such as oil. If the construction has been perfect the sheath is entirely filled with solids and liquids leaving no voids, but owing to increases of temperature to which cables are subjected in use the contents of the sheath, particularly the oil, expands and stretches the lead sheath beyond the limit of its elasticity thus permanently deforming it. When the cable cools the content of the sheath contracts to its normal volume, but the lead sheath, having been permanently deformed, cannot shrink to its original dimensions. Voids are thus produced between the sheath and conductor, and when the cable is subjected to high voltages, ionization is produced in such voids, leading to chemical change, local heating, and the ultimate weakening or destruction of the cable.

If impregnating oil having the same coefficient of expansion as lead could be used the difficulty noted above could be largely avoided, but no such oils are available. The coefficient of cubical expansion of petroleum is about .0009 while that of lead is about .00008 per degree centigrade, a ratio of more than ten to one. Assuming half of the cable volume to be oil and the rest of the same average coefficient as lead, and assuming a total lack of elasticity of the lead, the void resulting from a 40° range of temperature is computed to be about .0032 cubic inches per cubic inch of cable. This will result, for example, in 12.5 bubbles, each $\frac{1}{16}$ inch in diameter and spherical, per cubic inch of cable, or an equivalent when in bubbles of different size or sizes.

In the above example it may also be computed that the linear extension of the lead on the first heating is about 1.2%. If it is assumed that the elastic limit of lead is 2000 pounds per square inch, and its Young's modulus is $8 \times 10^6$, it only requires a stretch of about .02% to reach its elastic limit. Hence, over $\frac{9}{10}$ of the expansion must take place by permanent deformation of the lead above its elastic limit.

The present invention involves the provision of compressible material in cable construction which will, to a large degree, absorb the pressure exerted by the expansion of the oil or other content of the sheath thereby to prevent stretching of the lead sheath beyond its limit of elasticity (that is to a degree where it would permanently remain substantially deformed), such compressible substance being capable of resuming its normal volume and shape when the pressure upon it is relieved.

The invention is illustrated by concrete embodiments in the accompanying drawings in which—

Figure 5 is a cross-sectional view of a modified form of invention as applied to a single conductor cable;

Figure 6 is a perspective view, partly in cross-section, of one of the compression chambers forming the conductor core;

Figure 7 is a detail view, in cross-section, of an alternative form of compression chamber; and Figure 8 is a view showing a method of wrapping fillers with strands of a conductor when the conductor is "cabled".

Figure 1:
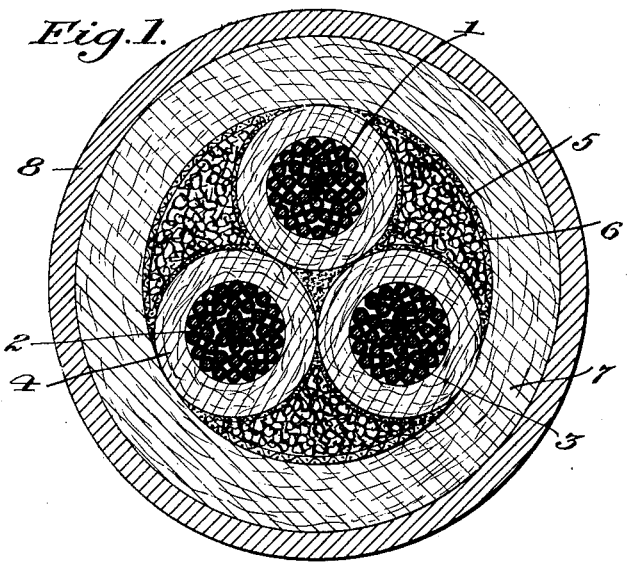
Figure 1 is a cross-sectional view of one form of cable made in accordance with the present invention.

In the particular embodiment shown in Fig. 1 conductors 1, 2 and 3 are wrapped with an insulation 4, preferably of paper. A plurality of tubular wrappers 5, of cloth or other suitable material, are filled with granular cork particles 6, and tightly packed around the conductors, being held in place by an outer winding 7 of paper. The whole is surrounded by a lead sheath 8 in the customary manner. Before the sheath is applied the parts are preferably impregnated with oil.

Figure 2:
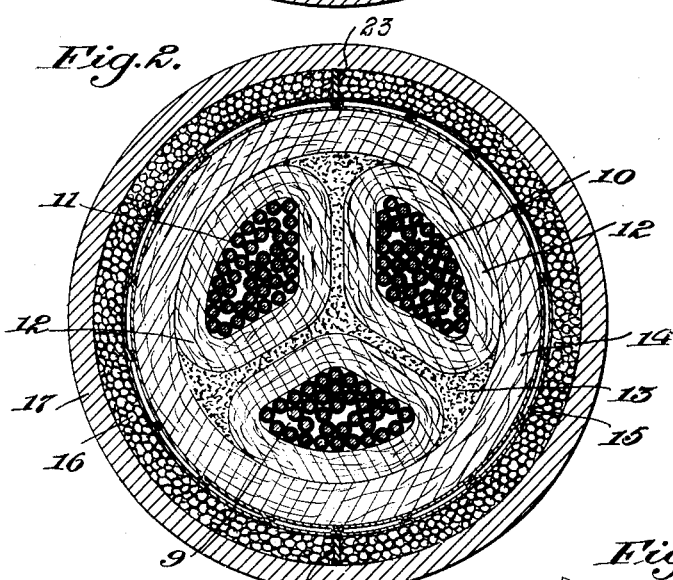
Figure 2 is a cross-sectional view of another form of cable embodying the present invention.
Figure 4:
Figure 4 is a detail view showing the method of winding the metal shield upon the cable in the process of its manufacture.
Figure 3:
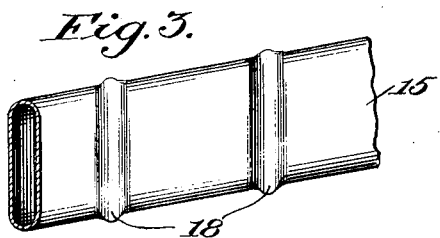
Figure 3 is a detail perspective view of the metal shield as used in the cable shown in Figure 2.

In Figure 2 the conductors 9, 10 and 11 are separately covered with insulation 12 of wrapped paper. A filler 13, composed of small pieces of paper, jute, or similar material, is packed around and between the conductors, and is held in position by a belt 14 of paper insulation. The insulation material is preferably impregnated with oil. A cushion member 15, such as shown in detail in Figs. 3 and 4, may be wrapped around belt 14. This member comprises a hollow metal strip, preferably formed of copper tubing, the walls of which are approximately .0015 of an inch thick. The tubing is pressed to rectangular shape in cross-section and its interior surface tinned. While hot it is pressed along lines 18 so that the walls are soldered together at these points thereby forming a plurality of uncommunicating air cushions as illustrated in Fig. 3. The use of a metal cushion member is optional, and, under some conditions, preferably omitted. Where such a member is used, however, it may be surrounded by a layer 16 of cork, and this, in turn, is encased in a sheath 17 in the usual manner.

In Figure 5 the cable is shown as being of the single conductor type, although it is to be understood that the invention is not restricted to the use of any particular number of conductors. As illustrated, stranded conductor 19 is provided with a core 20 composed of a plurality of hollow circular discs of the form shown in Figure 6 of the drawings. Each of such discs comprises an independent cushion member, and, in assembled position, a plurality of them are stacked with their faces in abutting relation. As an alternative to such construction a plurality of members such as shown at 21 in Fig. 7 may be used with like result. The cushion members 20 or 21 are filled with air at or above atmospheric pressure, and act as cushioning elements to relieve stress internally of the cable upon expansion of the impregnating fluid within the sheath. By sealing the cushion members the air is prevented from being forced into other parts of the cable. The conductor 19 is covered with wrapped paper or other insulation and this in turn is encased in the usual lead sheath 22, the parts within the sheath preferably being impregnated with oil.

Fig. 8 shows one method of incorporating tubular bodies of cork or the like in cables as illustrated at 6 in Fig. 1, the insulating bodies 6' preferably being cylindrical as shown and being twisted together with the conductors 1'. The bodies 6' may be formed in cylindrical shape initially and then pressed to the shape of bodies 6 in Fig. 1 in the process of twisting the conductors and applying the cable covering such as 7 and 8 in Fig. 1. For this method of manufacture the bodies 6' should be sufficiently yielding to conform to the contour of the spaces which they are intended to fill. While only two conductors and two insulating bodies are shown in Fig. 8 it will be understood that a greater number may be twisted together in similar manner. For example, the three conductors 1, 2 and 3 and the three insulating bodies 6 in Fig. 1 may be assembled in this manner.

In the practice of this invention it has been found desirable to use cork as the compressible material. It is impervious to most liquids and is very elastic. The first time it is compressed it suffers some permanent deformation, but thereafter it has remarkable elastic properties. Hence the cork is preferably subjected to compression before the sheath is applied. These properties result from the peculiar microscopic structure of the substance. It is composed of minute air cells enclosed in flexible, impervious membranes, such air cells or voids being in a typical sample of cork, each of approximately 50 microns diameter. It is the presence of these air cells which gives cork its elastic properties, which properties are utilized in carrying out the present invention in its preferred form.

I therefore propose that in constructing a power cable a small volume of cork be included in the construction to take up expansion of the oil, and prevent the formation of voids. If 8% of the volume of the cable is of cork it will be sufficient for ordinary cases. The cork may be placed in any part of the cable that is convenient, the drawings being illustrative only of some of the various practical embodiments, and not intended to limit the invention to any particular mode of construction. A layer next to the lead sheath has been found desirable inasmuch as it is here subjected to but little electric stress. If, in this position, it is found unable to withstand the small stresses to which it is subjected it can be protected by a copper shield, wound on the cable before the cork is applied, and connected to the sheath at intervals along the sheath, thus locating the compressible material in a region of low potential gradient. Thus, in Fig. 2 the metallic cushion member 15 may also function as a shield by connecting it to the sheath at intervals as indicated at 23 and 24. The cork may be used in the form of sheets, but is preferably granular for in this condition the oil penetrates more readily into surface cracks (though not into the interior air cells) in the impregnation process. Where, in the construction of the cable, it is found desirable or necessary to hold the cork in position during impregnation and the process of applying the sheath, it may be protected and held in place by one or more layers of paper. In applying the sheath, however, care should be taken not to compress the cork too much, but simply enough to prevent the formation of air voids, other than the small voids in the cork, inside the cable. In any case all interstices of substantial size within the sheath should be filled with impregnation material, although it will of course be understood that the minute cells within the cork or other cellular material, as well as the hollow shields or cushions, are not filled.

For convenience, in applying the cork it may be found desirable to prepare a strip of paper to which ground cork is affixed by a suitable adhesive which will not affect the operation of the finished cable. Or, in some cases, the cork may be incorporated in the paper itself by mixing it with the paper stock in the course of its manufacture. This latter method has certain advantages over those described above, notably in the ease of application and the uniformity of distribution of the cork which avoids the necessity of a flow of viscous oil from one part of the cable section to another during heating and cooling. Such a flow must occur in present cable constructions, especially when the sheath stretches non-uniformly, and due to inequalities in the strength of the sheath at different points there is probably even a flow lengthwise of the cable. For example, it has been found by tests that large differences of pressure may occur in a cable when passed through a heat cycle even at points fairly close together at the same cross section. The same occurs with points spaced longitudinally along the cable. This is especially true with dense tightly wound paper. When a cable, assumed initally without voids and with no compressible material in the interior, is heated, there must be a flow of oil both radially and longitudinally toward points where the sheath stretches to provide space for the increased volume of oil. When such a cable is again cooled voids appear first at the places where the cooling first occurs. Pressure differences appear, and there is some flow of oil due to these. If there is compressible material, or any voids initially present, then during a heat cycle there will be flow of oil toward and from these. The placing of the compressible material, the porosity of the paper, and the viscosity of the oil should be so chosen that this flow can occur with small pressure differences at a speed sufficient to prevent voids forming even temporarily. With elastic material present, as herein disclosed, even voids which form temporarily in this way will later be filled up. A layer of cork near the sheath prevents the longitudinal flow (because the presence of cork at each cross section prevents the production of large pressure difference which would cause such a flow), but not the transverse flow. This latter, even if small, may be undesirable in some constructions on account of the high viscosity of the oil. Transverse flow is prevented by distributing the cork across the cross-section. This may be accomplished as above when, as in many important applications, the stresses imposed on the dielectric are sufficiently moderate so that cork itself has sufficient dielectric strength and freedom from ionization in the microscopic air pockets. If necessary, it can also be accomplished by placing layers of cork, shielded from electrostatic stress if necessary by metal sheets on each side, and connected together electrically at intervals as the cable is built up.

It is to be understood that this invention is not limited to the use of cork as an elastic material capable of taking up the expansion of an impregnating compound, but that any material of similar properties for this purpose may be used to equal advantage.

Having now described my invention what I claim is:—

1. In a cable, a conductor, a sealed sheath enclosing said conductor, thermally expansible impregnation material between the conductor and sheath, and means internally of said sheath subject to substantial change in volume upon a change in pressure inside the cable within the elastic limit of the sheath and having sufficient elasticity to expand after an increase in pressure followed by a decrease in pressure, due to expansion and contraction of said material, without creating voids large enough to permit substantial ionization.

2. A cable comprising in combination, a conductor, a sheath surrounding said conductor, an impregnating fluid between said conductor and sheath, and a compressible substance conformable with changes in volume of said impregnating fluid to prevent excessive stretching of said sheath, said substance having gas pockets and sufficient elasticity to expand substantially to its original volume after alternate increase and decrease in pressure without creating voids large enough to permit substantial ionization.

3. In a cable, a conductor, an outer sheath for housing said conductor, impregnating oil and cork within said sheath, the cork serving to absorb increasing pressure of the impregnating oil when expanding so that undue pressure will not be transmitted to the outer sheath, and the cork having been precompressed sufficiently to resume its original volume when such pressure is relieved.

4. A cable comprising a sealed sheath containing a conductor and compressible material containing small pockets, all interstices inside the sheath being substantially filled with thermally expansible impregnation liquid except for said pockets, said material having sufficient elasticity substantially to expand to its original volume after alternate increase and decrease of pressure without creating voids large enough to permit substantial ionization.

5. A cable comprising a sealed sheath containing a conductor and compressible material containing pockets so small that substantial ionization therein is prevented, parts inside the sheath being impregnated with insulating fluid and the interior of the sheath being substantially filled except for said pockets, said material having sufficient elasticity substantially to expand to its original volume after successive increase and decrease of pressure without creating voids large enough to permit substantial ionization.

6. A cable comprising a conductor and a sheath separated by material having pockets, a metallic shield between said conductor and said material, and means for preventing the accumulation of large potential difference between the shield and sheath.

7. A cable comprising a sheath containing a conductor and cork impregnated with insulating fluid, the interior of the sheath being substantially filled except for the cells in the cork, the cork being precompressed so that it will expand to normal volume after being further compressed and then released.

8. In a cable, a conductor, a sealed sheath enclosing said conductor, thermally expansible impregnation material between the conductor and sheath, and means internally of said sheath subject to substantial decrease in volume upon an increase in pressure inside the sheath within the elastic limit of the sheath, due to expansion of said material, and having sufficient elasticity to expand substantially to its original volume upon subsequent contraction of said material.

9. A cable comprising a sheath containing a conductor and compressible material containing pockets so small that ionization therein is substantially prevented, and shielding means for protecting the pockets from electric stresses.

10. In a cable, a conductor, a sealed sheath enclosing the conductor with inner and outer annular regions of different potential gradients therebetween, thermally expansible impregnation material in the region of lower potential gradient, and means internally of said sheath subject to substantial change in volume upon a change in pressure inside the cable within the elastic limit of the sheath and having sufficient elasticity to expand after an increase in pressure followed by a decrease in pressure, due to expansion and contraction of said material, without creating voids large enough to permit substantial ionization.

11. A high tension cable comprising a conductor, insulation therefor which includes a fluid, and an impervious sheath, in combination with a cellular element which is spirally wound around the insulation and is situated between it and the sheath and which contracts and expands as the fluid within the sheath heats and cools.

12. A high tension cable comprising in combination a conductor, insulation therefor which includes a compound, an impervious sheath surrounding the insulated conductor, and means within said sheath exteriorly of said insulated conductor responsive in volume to variations of pressure within the cable sheath to compensate for any change in the volume of the materials of the cable.

13. A high tension cable comprising in combination a plurality of insulated conductors, an impervious sheath surrounding the insulated conductors, insulating compound saturating the conductor insulation and filling spaces within said sheath, and means in the valleys between the insulated conductors and the sheath to maintain the insulating compound continuously under pressure and compensate for any change in the volume of the insulating compound due to change in temperature.

14. A cable comprising a conductor, a sheath, and a metallic shield, insulating means for maintaining the conductor and shield in position, material having pockets and located between said sheath and shield, impregnating fluid filling all interstices within the sheath except said pockets, and means for preventing the accumulation of large potential difference between the shield and sheath.

15. A cable comprising a sheath containing a conductor, elastic material containing pockets, shielding means for protecting the pockets from electric stresses, and means for maintaining the conductor and shield in proper position within the sheath.

16. A high tension cable comprising in combination a conductor, insulation therefor which includes a compound, an impervious sheath surrounding the insulated conductor, and means within said sheath responsive in volume to variations of pressure within the cable sheath to compensate for any change in the volume of the materials of the cable.

17. An article of the character described comprising a closed sheath surrounding a plurality of electric conductors separately surrounded by insulating material, and fillers between said insulated conductors, said fillers comprising means which re-expands to substantially its original volume after having been compressed, without being subject to formation of voids when re-expanding.

18. An article of the character described comprising a hermetically sealed sheath containing a plurality of separately insulated cables, and fillers in the spaces between the cables, the fillers comprising means subject to substantial change in volume upon a change in pressure within the elastic limit of the sheath and having sufficient elasticity to expand after an increase in pressure followed by decrease in pressure without creating voids large enough to permit substantial ionization.

19. An article of the character described comprising a closed sheath surrounding a plurality of electric conductors separately surrounded by insulating material and fillers of elastic material between said insulated conductors, said insulating material and said fillers being impregnated with a liquid insulator subject to expansion under heat and said fillers being capable of being compressed, compensating expansion of said liquid insulator to a degree avoiding stretching of said sheath beyond its elastic limit, and being capable of re-expanding to substantially the previous volume without the formation of voids.

20. An article of the character described comprising a closed sheath surrounding a plurality of electric conductors separately surrounded by insulating material and fillers of pre-compressed cork between said insulated conductors, said insulating material and said cork fillers being impregnated with a liquid insulator subject to expansion under heat, and said cork fillers being capable of being compressed, compensating the expansion of said liquid insulator to a degree avoiding stretching of said sheath beyond its elastic limit, and being capable of re-expanding to substantially the previous volume without the formation of voids.

21. A cable having three separately insulated electric conductors, fillers comprising tubes of porous material containing granular cork particles in the spaces between said conductors, insulating material surrounding said conductors and said tubes, said fillers and said insulating material being impregnated with a liquid insulator subject to heat expansion, and a closed sheath surrounding said insulating material, said cork particles being precompressed and capable of compression compensating the expansion of said liquid insulator to a degree avoiding stretching of said sheath beyond its elastic limit, and capable of re-expanding to substantially the previous volume without the formation of voids.

22. In a cable, a conductor, an insulating wrapping surrounding said conductor, a plurality of tubes of flexible insulating material surrounding said wrapper, granulated cork in each of said tubes, a belt of insulation surrounding said tubes and holding them in position, the whole being impregnated with oil, and an outer sheath of lead.

23. In a cable, a conductor, a sealed sheath enclosing said conductor, thermally expansible impregnation material between the conductor and sheath, and hollow metallic cushion means internally of said sheath subject to substantial change in volume upon a change in pressure inside the cable within the elastic limit of the sheath and having sufficient elasticity to expand after an increase in pressure followed by a decrease in pressure, due to expansion and contraction of said material, without creating voids large enough to permit substantial ionization.

24. A cable comprising in combination, a conductor, a sheath surrounding said conductor, an impregnating fluid between said conductor and sheath, and a compressible cushion conformable with changes in volume of said impregnating fluid to prevent excessive stretching of said sheath, said cushion being hollow and having thin elastic walls so as to expand substantially to its original volume after alternate increase and decrease in pressure without creating voids large enough to permit substantial ionization.

25. In a cable, a conductor, an outer sheath for housing said conductor, impregnating oil and a series of cushion units within said sheath, said units serving to absorb increasing pressure of the impregnating oil when expanding so that undue pressure will not be transmitted to the outer sheath, and the units having sufficient elasticity to resume their original volume when such pressure is relieved.

26. A cable comprising a sealed sheath containing a conductor and compressible units containing large pockets, all interstices inside the sheath being substantially filled with thermally expansible impregnation liquid except for said pockets, said units having sufficient elasticity substantially to expand to their original volume after alternate increase and decrease of pressure without creating voids large enough to permit substantial ionization.

27. A cable comprising a sealed sheath containing a conductor and hollow cushion means having its walls formed of material which prevents substantial ionization therein, parts inside the sheath being impregnated with insulating fluid and the interior of the sheath being substantially filled except within said hollow cushion means, said means having sufficient elasticity substantially to expand to its original volume after successive increase and decrease of pressure without creating voids large enough to permit substantial ionization.

28. In a cable, a conductor, a sealed sheath enclosing said conductor, thermally expansible impregnation material between the conductor and sheath, and hollow substantially air-tight cushion means internally of said sheath subject to substantial change in volume upon a change in pressure inside the cable within the elastic limit of the sheath and having sufficient elasticity to expand after an increase in pressure followed by a decrease in pressure, due to expansion and contraction of said material, without creating voids large enough to permit substantial ionization.

29. A cable comprising a sheath containing a conductor, insulation impregnated with insulating fluid, and hollow metallic cushion means, the interior of the sheath being substantially filled except within said cushion means, said means having sufficient elasticity so that it will expand to normal volume after being compressed and then released.

30. In a cable, a conductor, a sealed sheath enclosing said conductor, thermally expansible impregnation material between the conductor and sheath, and metallic cushion means internally of said sheath subject to substantial decrease in volume upon an increase in pressure inside the sheath within the elastic limit of the sheath, due to expansion of said material, and having sufficient elasticity to expand substantially to its original volume upon subsequent contraction of said material.

31. In a cable, a conductor, a sealed sheath enclosing said conductor, thermally expansible impregnation material between the conductor and sheath, and hollow corrugated cushion means internally of said sheath subject to substantial change in volume upon a change in pressure inside the cable within the elastic limit of the sheath and having sufficient elasticity to expand after an increase in pressure followed by a decrease in pressure, due to expansion and contraction of said material, without creating voids large enough to permit substantial ionization.

32. In a high-voltage cable, a hollow core conductor, a permeable insulating envelope surrounding the conductor, a sheath enclosing the whole, a fluid insulating medium filling the core of the cable and with which the permeable insulation is saturated and all other spaces are filled, and means within the cable core to compensate for any change in the volume of the liquid insulating medium due to change in temperature, whereby the formation of voids or spaces within the cable is prevented.

33. An electric cable insulated with grease-like material and with fibrous material and containing collapsible reservoirs at intervals of length along the cable, said reservoirs being responsive in volume to variations of pressure within the cable.

34. In combination in a cable, an insulated conductor, a fluid-tight sheath therefor, a channel within the sheath which contains fluid insulation that impregnates the insulation on the conductor and a plurality of sealed, cellular elements of small diameter located side by side in the channel and supported by the walls thereof, each of which has elastic side walls which move axially in response to changes of volume of the fluid in the channel.

35. A cable comprising a conductor, a sheath around the conductor, and a series of hollow containers longitudinally laid within the sheath, each of said containers having peripheral convolutions whereby they are rendered longitudinally expansible to an appreciable degree.

36. An electric cable having fibrous insulation impregnated with an oily material and compensating means wholly disposed within the cable to afford by a varying longitudinal compression thereof by the action of the oily material as it expands and contracts, protection against such pressure conditions which would damage or cause vacua in the cable.

VANNEVAR BUSH.